United States Patent
Lu et al.

(10) Patent No.: US 7,095,408 B1
(45) Date of Patent: Aug. 22, 2006

(54) SYSTEM AND METHOD FOR CREATING THREE-DIMENSIONAL GRAPHIC OBJECT HAVING CONVEX OR CONCAVE PORTIONS

(75) Inventors: Kuang-Rong Lu, Kaohsiung (TW); Shin-Chin Lee, Taipei (TW)

(73) Assignee: ULEAD Systems, Inc., Taipei (TW)

( * ) Notice: Subject to any disclaimer, the term of this patent is extended or adjusted under 35 U.S.C. 154(b) by 0 days.

(21) Appl. No.: 09/358,862

(22) Filed: Jul. 22, 1999

(51) Int. Cl.
*G06T 15/00* (2006.01)

(52) U.S. Cl. ........................................ 345/419; 345/964

(58) Field of Classification Search ................. 345/419, 345/964
See application file for complete search history.

(56) References Cited

OTHER PUBLICATIONS

Fuller, Using AutoCAD Release 10 with 3–D, Third Edition, 1991.*

Fuller, Using AutoCAD Release 10 with 3–D, Third Edition, Delmar Publishers, Inc., 1991, pp. 19–1 through 19–30.*

* cited by examiner

*Primary Examiner*—Mark Zimmerman
*Assistant Examiner*—Lance W. Sealey
(74) *Attorney, Agent, or Firm*—Ladas & Parry LLP

(57) ABSTRACT

A system and method for creating a three-dimensional graphic object is disclosed. The system comprises an outline-processing unit for modeling a first two-dimensional object by at least one outline, a curve-processing unit for modeling a second two-dimensional object by a closed curve, a curve-adjusting unit for adjusting the closed curve in response to the outline so as to generate a third two-dimensional object, a uniting unit for uniting the first and third two-dimensional objects to generate a-fourth two-dimensional object modeled by the adjusted closed curve and the at least one outline, a 3-D creating unit for generating the first, third and fourth two-dimensional objects three-dimensional to form a first three-dimensional object, a second three-dimensional object and a third three-dimensional object, respectively, and a graphics-combining unit for grouping two of the first, second and third three-dimensional objects for creating the three-dimensional graphic object in response to either a convex or a concave mode selection.

20 Claims, 3 Drawing Sheets

SYSTEM AND METHOD FOR CREATING THREE-DIMENSIONAL GRAPHIC OBJECT HAVING CONVEX OR CONCAVE PORTIONS

BACKGROUND OF THE INVENTION

1. Field of the Invention

The present invention generally relates to computer graphics. More particularly, the present invention is directed to a system and method for creating a three-dimensional graphic object having convex or concave portions.

2. Description of the Related Art

The growing popularity of computers has enabled conventional film clips, graphics and pictures to be digitized for computer processing, allowing special visual effects never before possible. Computer imaging or graphing is also gaining a foothold in diverse professional areas such as education, science, engineering, medicine, commerce, the military, advertising, and entertainment, because of the widespread use of computers.

Referring to FIG. 1, a conventional process flow for creating a three-dimensional bounding board having a visual effect of a convex or concave character is schematically illustrated. First, a user selects a text character "A" 10 and a quadrangular shape 11 to be processed. For example, the user can select buttons directed to the required text character 10 and quadrangle 11 on pull-down or pop-up screen menus of interactive application programs to make choices. The selected text character 10 and quadrangle 11 are thereafter processed by polygon mesh modeling to generate smooth outlines and curves. As shown in FIG. 1, the text character "A" 10 is modeled by two outlines 100 and 102, where the quadrangle 11 is modeled by a closed curve 110.

Then, by using three-dimensional creating techniques, the portion 104 of the modeled text character 10 bounded by the outlines 100 and 102 is extruded to generate an extruded character 12, while the portion 112 of the modeled quadrangle 11 bounded by the closed curve 110 is extruded to generate an extruded quadrangle 13, as shown in FIG. 1. Therefore, the extruded character 12 and the extruded quadrangle 13 are composed of three-dimensional mesh data. If the user would like to create a visually convex effect on the bounding board, the extruded text character 12 is combined with the extruded quadrangle 13 to create a graphic object 14 with the convex character. If the user chooses to create a visually concave effect on the bounding board, both the extruded character 12 and the extruded quadrangle 13 are subjected to an Boolean exclusive-OR operation so as to create a graphic object 15 with the concave character.

However, prior to the formation of the convex graphic object 14 or the concave graphic object 15, the extruded quadrangle 13 should be adjusted to fit the extruded text character 12. As shown in FIG. 1, the area of the extruded quadrangle 13 should be extended so that the curve 110 can encompass the outlines 100 and 102, or, at least, the curve 110 should be tangential to the vertexes 105, 106 and 107 of character 10. However, it is quite burdensome to handle the mesh data under the three-dimensional environment.

SUMMARY OF THE INVENTION

Therefore, it is an object of the present invention to provide a performance-effective system and method for creating a three dimensional graphic with convex or concave portions.

For achieving the above-identified object, the present invention can provide a method of creating a three-dimensional graphic object. First, a first two-dimensional object modeled by at least one outline and a second two-dimensional object modeled by a closed curve are selected by a user. Next, the closed curve is adjusted to generate a third two-dimensional object in response to the outline. A portion of the first two-dimensional object bounded by the outline and a portion of the third two-dimensional object bounded by the adjusted closed curve are thereafter created three-dimensional to form a first three-dimensional object and a second three-dimensional object, respectively. Then, the first and second three-dimensional objects are grouped to create the three-dimensional graphic object.

Moreover, the present invention provides another method for creating a three-dimensional graphic object. First, a first two-dimensional object modeled by at least one outline and a second two-dimensional object modeled by a closed curve are selected by a user. Next, the closed curve is adjusted to generate a third two-dimensional object in response to the outline. Then, the first and third two-dimensional objects are united together to be a fourth two-dimensional object modeled by the adjusted closed curve and the outline. A portion of the fourth two-dimensional object bounded between the adjusted closed curve and the at least one outline and a portion of the third two-dimensional object bounded by the adjusted closed curve are created three-dimensional to form a first three-dimensional object and a second three-dimensional object, respectively. Then, the first and second three-dimensional objects are grouped to create the three-dimensional graphic object.

Furthermore, the present invention provides a system for creating a three-dimensional graphic object, comprising: first means for modeling a first two-dimensional object by at least one outline; second means for modeling a second two-dimensional object by a closed curve; third means for adjusting the closed curve in response to the at least one outline so as to generate a third two-dimensional object; fourth means for uniting the first and third two-dimensional objects to generate a fourth two-dimensional object modeled by the adjusted closed curve and the at least one outline; fifth means for creating the first, third and fourth two-dimensional objects three-dimensional to form a first three-dimensional object, a second three-dimensional object and a third three-dimensional object, respectively; and sixth means for grouping two of the first, second and third three-dimensional objects for creating the three-dimensional graphic object in response to a mode selection.

BRIEF DESCRIPTION OF DRAWINGS

The following detailed description, given by way of examples and not intended to limit the invention to the embodiments described herein, will best be understood in conjunction with the accompanying drawings, in which.

DETAILED DESCRIPTION OF THE INVENTION

Figure 1:
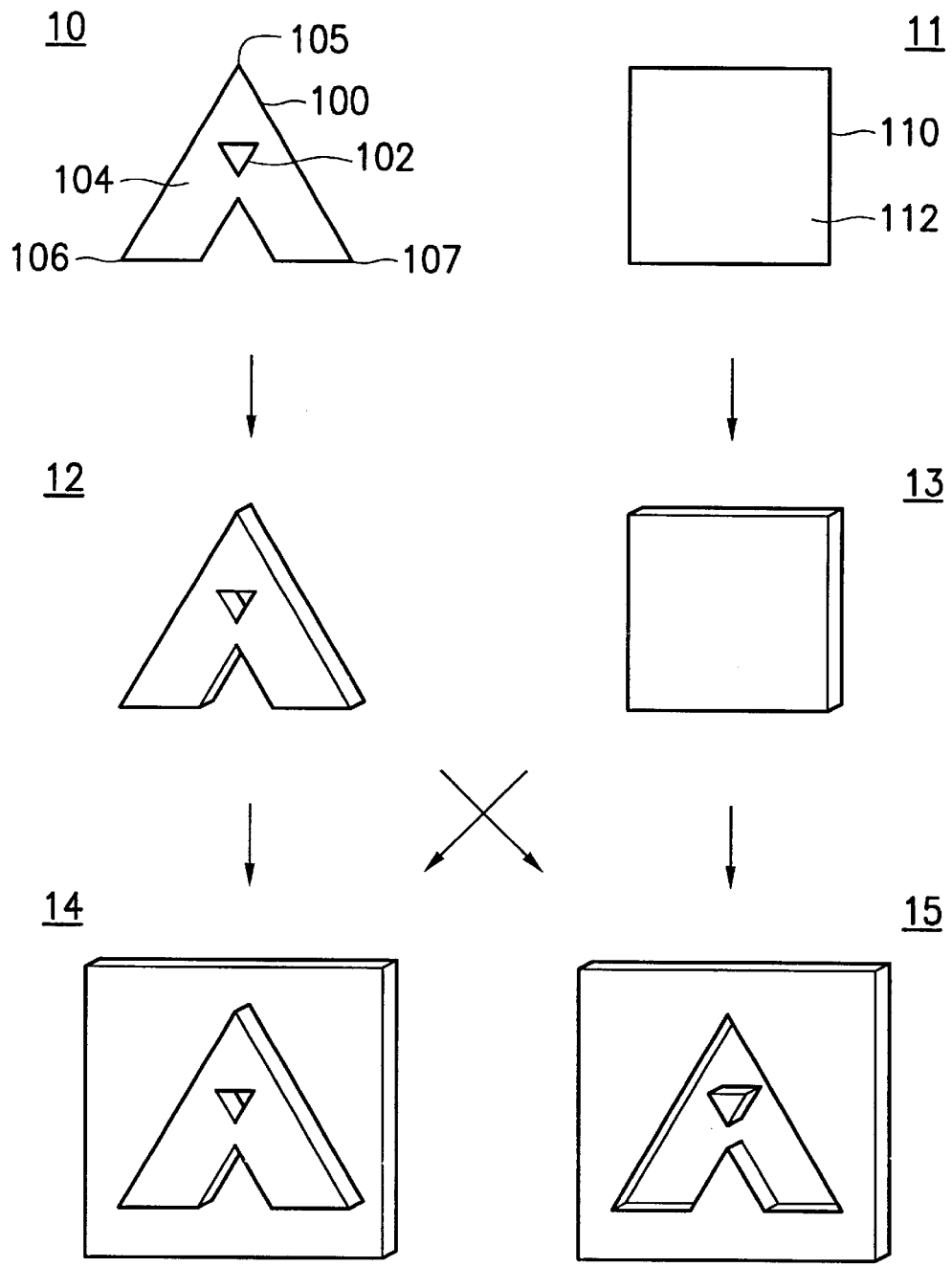
FIG. 1 schematically illustrates a conventional process flow for creating a three-dimensional bounding board having a visually convex or concave effect thereon.
Figure 2:
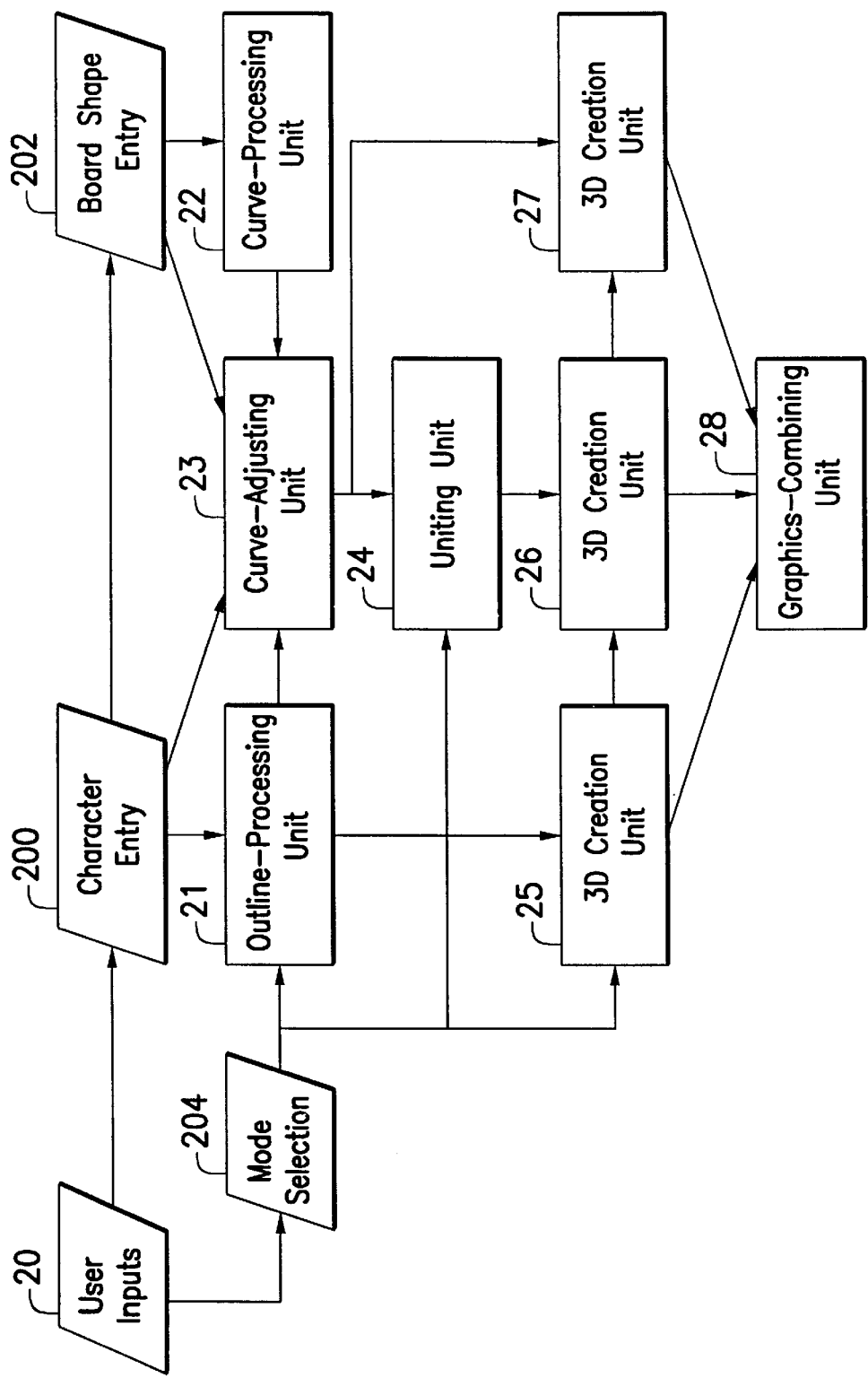
FIG. 2 schematically illustrates a block diagram of a system for creating a three-dimensional graphic object in accordance with one preferred embodiment of the present invention.

Referring to FIG. 2, a block diagram of a system for creating a three-dimensional graphic object in accordance with one preferred embodiment of the present invention is schematically illustrated. In FIG. 2, a block 20 denotes inputs provided by a user. For example, the user can select buttons directed to the required inputs on pull-down or pop-up screen menus of interactive application programs to make choices. Also, the inputs 20 can be any key-in or type-in entry on dialog windows of the interactive application programs by the user. In this embodiment, the inputs 20 comprises a character entry 200, a board shape 202 and mode selection 204, wherein the mode selection 200 can be either a convex mode or a concave mode.

The system of FIG. 2 comprises an outline-processing unit 21, a curve-processing unit 22, a curve-adjusting unit 23, a union unit 24, three-dimensional creation units 25–27, and a graphics-combining unit 28, all of which can be within a general-purpose computer system. The operation of each unit in FIG. 2 will be described in conjunction with FIG. 3.

Figure 3:
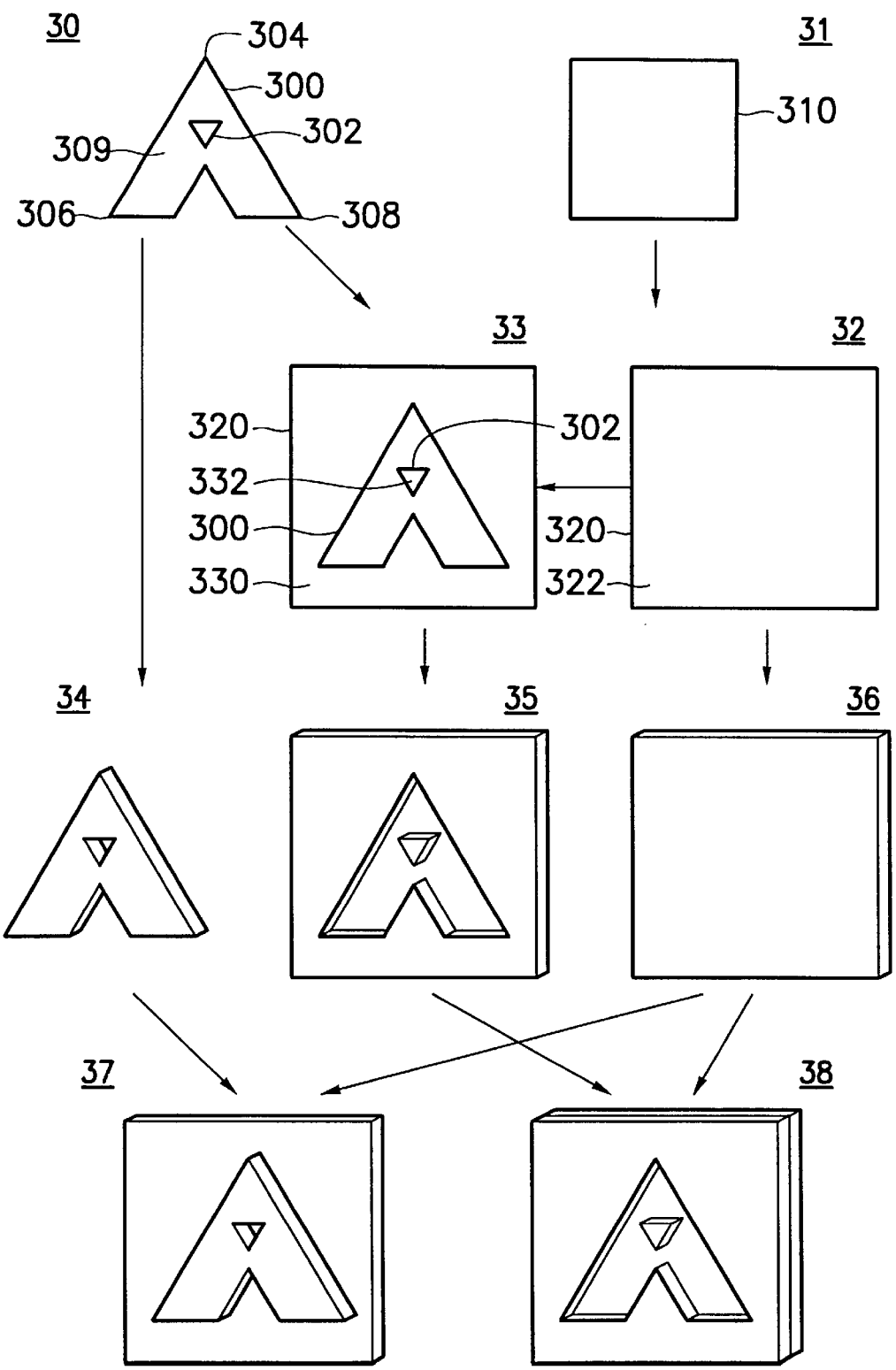
FIG. 3 schematically illustrates a process flow for the system of FIG. 2.

Referring to FIG. 3, a process flow for the system of FIG. 2 is schematically illustrated. As an example, the user selects a text character "A" 30 as the input character 200 and a quadrangle 31 as the board shape 202 in this embodiment. However, this is not intended to limit the scope of the present invention to that example. The character entry 200 may include one or more characters which are letters, symbols, Chinese characters, or the combination thereof. The board shape 202 can be a triangle, circle, square, rectangle, polygon or some irregular shapes.

As shown in FIG. 3, the selected text character 30 and quadrangle 31 are thereafter processed by the outline-processing unit 21 and the curve-processing unit 22, respectively. For example, the outline-processing unit 21 and curve-processing unit 22 may utilize polygon mesh modeling, Bezier curve modeling, or B-Spline curve modeling to generate smooth outlines and curve. Moreover, if the selected text character 30 is one of true type font, the outline-processing unit 21 can use degree 2 B-Spline curve to model the character outlines. As shown in FIG. 3, the text character 30 is modeled by outlines 300 and 302, and the quadrangle 31 is modeled by a closed curve 310. Here, the closed curve 310 denotes a unique and non-intersectional loop.

Then, by means of the curve-adjusting unit 23, the modeled quadrangle 31 is adjusted in response to the outlines 300 and 302 in order to fit the text character 30. As shown in FIG. 3, the modeled quadrangle 31 should be adjusted by extending the curve 310 to generate an adjusted quadrangle 32. Therefore, the adjusted quadrangle 32 is modeled by an extended closed curve 320, which can encompass the outlines 300 and 302. At least, the extended curve 320 should be tangential to vertexes 304, 306 and 308 of the modeled character 30. According to the present invention, the adjustment of the board shape is applied to two-dimensional polygon data so that the performance is more effective in contrast with the adjustment of three-dimensional mesh data as the conventional process flow. Next, the modeled character 30 and the adjusted quadrangle 32 are combined together by the uniting unit 24 to be a combined template 33 modeled by the outlines 300 and 302 and the curve 320. As an example, the uniting unit 24 may use Union Boolean operation to union the objects 30 and 32.

The modeled text character 30, the combined template 33 and the adjusted quadrangle 32 are created three-dimensional by the three-dimensional creation units 25, 26 and 27, respectively, employing graphic three-dimensional object creation techniques. In this embodiment, the three-dimensional creation units 25–27 perform extrusion operations and thus generate an extruded text character 34, an extruded template 35 and an bounding board 36, respectively. As shown in FIG. 3, the portion 309 of the modeled text character 30 bounded by the outlines 300 and 302 is extruded to generate the extruded character 34, while the portion 322 of the adjusted quadrangle 32 bounded by the closed curve 320 is extruded to generate the bounding board 36. Moreover, the portion 330 bounded between the outline 300 and the closed curve 320 and the portion 332 bounded by the outline 302 are extruded to form the extruded template 35.

If the mode selection 204 is the convex mode, the extruded character 34 is combined with the bounding board 36 by the graphics-combining unit 28 to form a three-dimensional graphic object 37 with a visually convex effect thereon. For example, the objects 34 and 36 are combined by adjusting the Z-position of the object 34 such that it looks like attached on the surface of the object 36.

If the mode selection 204 is the concave mode, the extruded template 35 will be combined with the bounding board 36 by the graphics-combining unit 28 to form a three dimensional graphic object 38 with a visually concave effect thereon. For example, the objects 35 and 36 are combined by adjusting the Z-position of the object 35 such that it looks like attached on the surface of the object 36.

When the visually convex effect is desired, only the extruded character 34 and the bounding board 36 need to be combined together, and the extruded template 35 is null. Therefore, the convex mode can be utilized to disable the uniting unit 24 and the three-dimensional creation unit 27 to further enhance the overall performance.

For the same reason, if the visually concave effect is desired, only the extruded template 35 and the bounding board 36 need to be combined together, and the extruded character 34 is null. Therefore, the concave mode can be utilized to disable the three-dimensional creation unit 25 to further enhance the overall performance.

While the invention has been described with reference to various illustrative embodiments, the description is not intended to be construed in a limiting sense. Various modifications of the illustrative embodiments, as well as other embodiments of the invention, will be apparent to those person skilled in the art upon reference to this description. It is therefore contemplated that the appended claims will cover any such modifications or embodiments as may fall within the scope of the invention defined by the following claims and their equivalents.

What is claimed is:

1. A method of creating a three-dimensional graphic object, comprising the steps of:

(a) selecting a first two-dimensional object modeled by at least one outline and a second two-dimensional object modeled by a closed curve;

(b) automatically adjusting said closed curve in response to said at least one outline to generate a third two-dimensional object;

(c) creating three-dimensionally a portion of said first two-dimensional object bounded by said at least one outline and a portion of said third two-dimensional object bounded by said adjusted closed curve so as to form a first three-dimensional object and a second three-dimensional object, respectively;

(d) grouping said first and second three-dimensional objects to create said three-dimensional graphic object; and (e) displaying the three-dimensional graphic object.

2. The method as claimed in claim 1, wherein said first two-dimensional object is a modeled character.

3. The method as claimed in claim 1, wherein said second two-dimensional object is a modeled board shape.

4. The method as claimed in claim 1, wherein the step (b) comprises the step of adjusting said closed curve to encompass said at least one outline.

5. The method as claimed in claim 4, wherein said adjusted closed curve is tangential to at least one vertex of said first two-dimensional object.

6. The method as claimed in claim 1, wherein the step (c) comprises the step of extruding the portion of said first two-dimensional object bounded by said at least one outline, and the step of extruding the portion of said third two-dimensional object bounded by said adjusted closed curve.

7. A method of creating a three-dimensional graphic object, comprising the steps of:

(a) selecting a first two-dimensional object modeled by at least one outline and a second two-dimensional object modeled by a closed curve;

(b) automatically adjusting said closed curve in response to said at least one outline so as to generate a third two-dimensional object;

(c) uniting said first and third two-dimensional objects to generate a fourth two-dimensional object modeled by said adjusted closed curve and said at least one outline;

(d) creating three-dimensionally a portion of said fourth two-dimensional object bounded between said adjusted closed curve and said at least one outline and a portion of said third two-dimensional object bounded by said adjusted closed curve to form a first three-dimensional object and a second three-dimensional object, respectively;

(e) grouping said first and second three-dimensional objects to create said three-dimensional graphic object; and (f) displaying the three-dimensional graphic object.

8. The method as claimed in claim 7, wherein said first two-dimensional object is a modeled character.

9. The method as claimed in claim 7, wherein said second two-dimensional object is a modeled board shape.

10. The method as claimed in claim 7, wherein the step (b) comprises the step of adjusting said closed curve to encompass said at least one outline.

11. The method as claimed in claim 10, wherein said adjusted closed curve is tangential to at least one vertex of said first two-dimensional object.

12. The method as claimed in claim 7, wherein the step (d) comprises the step of extruding the portion of said fourth two-dimensional object bounded between said adjusted closed curve and said at least one outline, and the step of extruding the portion of said third two-dimensional object bounded by said adjusted closed curve.

13. A system for creating a three-dimensional graphic object, comprising:

first means for modeling a first two-dimensional object by at least one outline;

second means for modeling a second two-dimensional object by a closed curve;

third means for automatically adjusting said closed curve in response to said at least one outline so as to generate a third two-dimensional object;

fourth means for uniting said first and third two-dimensional objects to generate a fourth two-dimensional object modeled by said adjusted closed curve and said at least one outline;

fifth means for creating said first, third and fourth two-dimensional objects three-dimensionally to form a first three-dimensional object, a second three-dimensional object and a third three-dimensional object, respectively;

sixth means for grouping two of said first, second and third three-dimensional objects for creating said three-dimensional graphic object in response to a mode selection; and seventh means for displaying the three-dimensional graphic object.

14. The system as claimed in claim 13, wherein said first two-dimensional object is a modeled character.

15. The system as claimed in claim 13, wherein said second two-dimensional object is a modeled board shape.

16. The system as claimed in claim 13, wherein said adjusted closed curve is adjusted by said third means to encompass said at least one outline.

17. The system as claimed in claim 16, wherein said adjusted closed curve is tangential to at least one vertex of said first two-dimensional object.

18. The system as claimed in claim 13, wherein said fifth means performs extrusion operations.

19. The system as claimed in claim 18, sixth means is used to group said first and second three-dimensional objects when said mode selection is a convex mode.

20. The system as claimed in claim 18, sixth means is used to group said second and third three-dimensional objects when said mode selection is a concave mode.

* * * * *